(No Model.) 2 Sheets—Sheet 1.
J. W. EMERSON & A. C. STARBIRD.
FRUIT GATHERER.
No. 442,702. Patented Dec. 16, 1890.
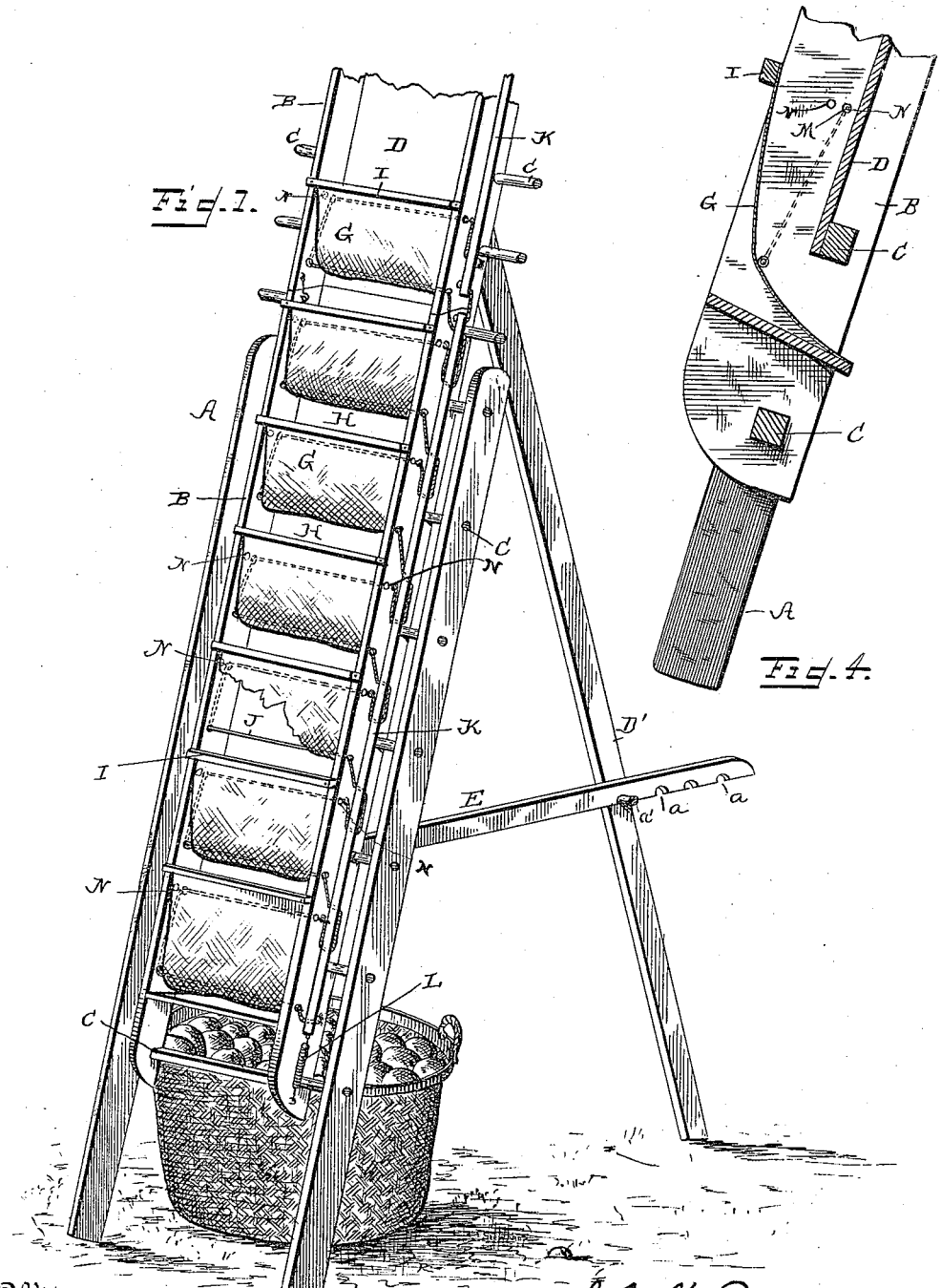

(No Model.) 2 Sheets—Sheet 2.
J. W. EMERSON & A. C. STARBIRD.
FRUIT GATHERER.
No. 442,702. Patented Dec. 16, 1890.
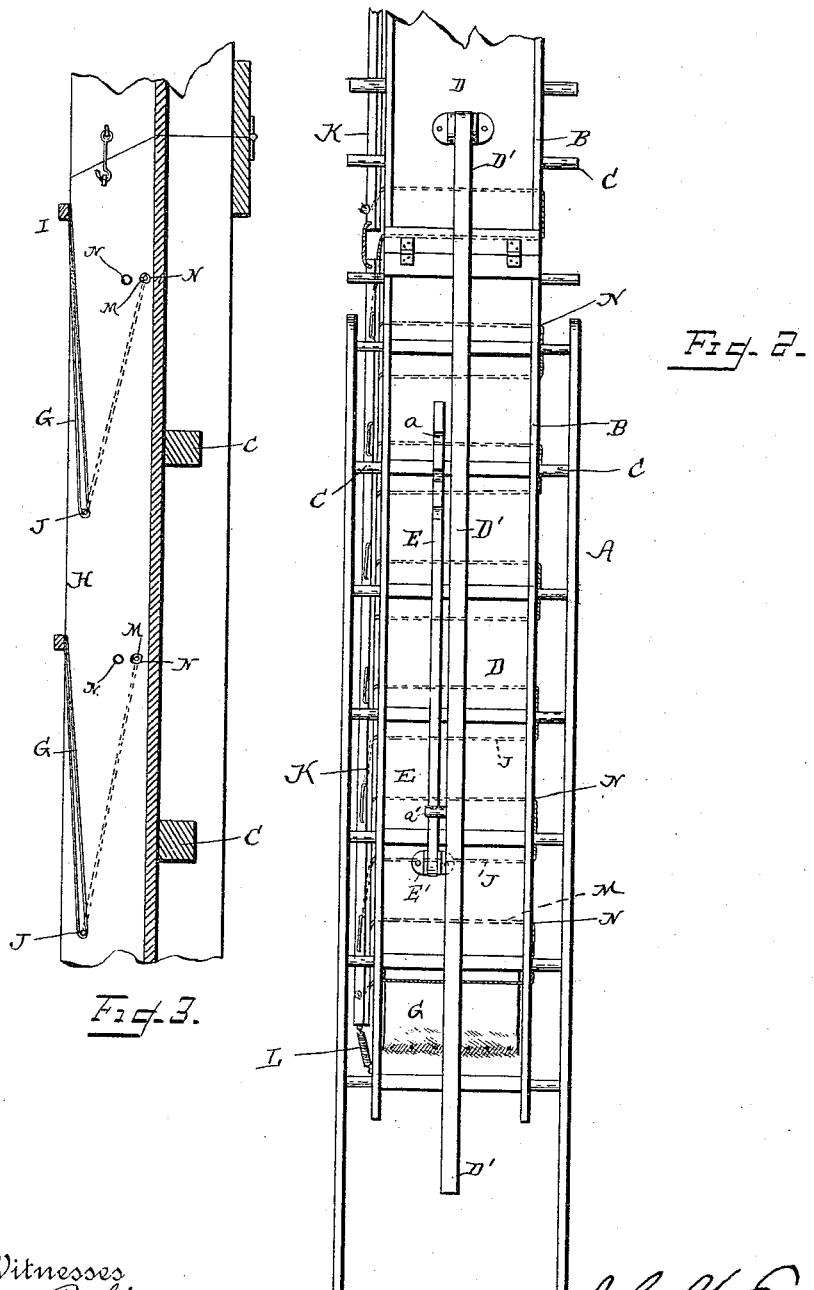

UNITED STATES PATENT OFFICE.

JOHN W. EMERSON AND AUSTIN C. STARBIRD, OF APOPKA, FLORIDA, ASSIGNORS OF ONE-THIRD TO CONSTANTINE A. HEGE, OF SALEM, NORTH CAROLINA.

FRUIT-GATHERER.

SPECIFICATION forming part of Letters Patent No. 442,702, dated December 16, 1890.

Application filed November 12, 1889. Serial No. 330,023. (No model.)

*To all whom it may concern:*

Be it known that we, JOHN W. EMERSON and AUSTIN C. STARBIRD, citizens of the United States, residing at Apopka, in the county of Orange and State of Florida, have invented certain new and useful Improvements in Fruit-Gatherers; and we do hereby declare the following to be a full, clear, and exact description of the invention, such as will enable others skilled in the art to which it appertains to make and use the same.

Our invention relates to fruit-gatherers, and more particularly to gatherers for use in harvesting oranges, but which may be used in harvesting fruits of various kinds and other productions in which the product is to be delivered from a higher to a lower plane.

Among some of the objects of the invention may be mentioned the adjustment of the diameter of the delivery chute or way, so as to adapt it to different kinds and sizes of fruit in the harvesting of which the gatherer may be employed; also for increasing at will in the use of the gatherer the inside diameter of the chute or way where there may be any obstruction, so that the obstruction or gorge, whether from an unusually large specimen of fruit or the jamming of several specimens of average size, may be removed and the traveling of the fruit rendered free, and the subsequent contraction of the diameter of the way to its former size; also to provide an open-face trough or way with flexible or yielding shields at points throughout its length, with the lower portion of all or some of the shields rendered expansible, and with an open space between the lower end of one and the upper end of the next shield, so as to prevent the fruit from bounding out of the trough in its downward travel, allow the introduction of the fruit at different points in the length of the trough, and also permit the enlargement of the space under the lower portion of the shield, so as to allow a large specimen or a gorge of fruit to pass from back of the shield; also to provide a chute or way having openings throughout its length for the introduction of fruit, with flexible shields extending from one opening to the next and contracted at their lower ends, so as to allow the free entry of the fruit into the space back of the upper end of the shield, and, while permitting it to pass from behind the lower end of the shield, yet checking its momentum by such contracted portion; also to combine with such a chute or way having flexible shields and openings a yielding check or cushion located back of the flexible shield and below the upper end of it and the open space above, so as to check the momentum of the falling fruit and throw it against the flexible shield to cushion and further check its fall; also to combine such a chute with a ladder and a support by which it can be sustained at the angle or inclination desired without bearing against the limbs of the tree, unless so desired, and which support will also serve as a lever for lifting the chute and ladder.

The foregoing are some of the main objects in view, and for the accomplishment of the same and such other advantages as may result from the construction we will proceed to describe the means for carrying the same into effect, reference being had to the accompanying drawings, forming a part hereof.

Figure 1 is a perspective of the invention in position for use, part of the upper section being broken away. Fig. 2 is a rear elevation of the gatherer when folded. Fig. 3 is a detail vertical section showing position of flexible shields. Fig. 4 is a detail section of the delivery end of the trough.

In the drawings, the letter A designates a ladder having a trough or way B secured thereto, preferably by having the rounds C passing through the sides of the trough back of the bottom D of the trough, thus bracing and strengthening the trough; but the parts may be otherwise secured together without departing from other features of the invention. If desired, the trough and ladder may be made in two or more lengths, each section suitably hinged to the other, so that the section not in use may be folded down out of the way, and for a portion of the length of the trough the side rails to the ladder may be omitted, so that only the rounds of the ladder will project and be beyond the sides of the trough, all as illustrated in Figs. 1 and 2. The ladder and trough are preferably sustained by a prop or lever D', suitably hinged or connected at its upper end to some part of the structure, so that its lower end will rest upon the ground, and a brace or adjusting-rod E, hinged or pivoted at one end to, say, a plate E', secured to the bottom D of the trough, will be provided with suitable catches adapted to engage with some part of the prop or lever D', so as to hold the prop at the angle desired to give the inclination wanted to the trough and ladder. A suitable catch is made by forming notches $a$ in the brace-rod, which will engage with a pin or stop $a'$ on the prop or lever D', as illustrated. By attaching the prop D', as described, with its lower end entirely free and unrestricted in its movements, it is adapted to serve as a lever in lifting the trough. The manner of operating it for that purpose is thiswise: The trough is laid its full length on the ground with the prop extended so as to carry its free end beyond or in the direction of the upper end of the trough and parallel with the trough. It is thus brought into a position that enables the operator to use the prop as a lever for lifting the trough, the application of the power being above or beyond the upper end of the trough, so that the trough is more easily lifted.

The trough or way B is formed, preferably, of wood with rigid sides and bottom, although it may be otherwise formed; but in any event it is provided with one open top or face side F. This open side, at intervals throughout its length, is provided with flexible or yielding shields G, made of canvas or other suitable material, and arranged so that openings H will be left between the lower end of one shield and the upper end of the next shield. These openings will serve for the introduction of fruit at different points, and the shields will serve to prevent the fruit from bounding out of the trough, and will also serve or assist in serving to check the downward momentum of the fruit and thus protect the fruit against damage or injury. These shields are preferably free along their edges—that is, are not rigidly secured at such points to the sides of the trough—and are drawn farther into the trough at their lower than at their upper ends, so as to give greater diameter to the space back of the shield at its upper than at its lower end, thus providing for the free entrance of the fruit at the upper end of the space and the checking of its fall at the lower end by reason of the reduced diameter. The upper ends of the shields are connected to the trough or way in any suitable manner. For instance, it may be by cross-pieces I, which may be straight or curved, rigid or flexible, or by a cord run across the trough, or otherwise. The lower ends of the shields are preferably connected to the trough by a cord or rope J, passed through a loop or fold in the material of which the shield is made. This flexible or yielding connection of the lower end of the shield to the trough allows the lower end of the shield to yield to change its form or expand, so as to allow the fruit to pass through. It is preferred to provide for a greater expansion or movement of the lower portion of the shield than the mere flexibility of the cord will permit, and so provision is made for slacking the cord, so as to allow the extent of movement desired or necessary. In providing for this slack provision is also made for taking up the slack after the necessity for it has passed. The preferred means of effecting this result is to connect the cord or rope J to a yielding or elastic connection, which may be a rod K, connected at some suitable point in its length to a suitable part of the structure by a spring or its equivalent—say at its lower end to a round or side rail of the ladder or to the trough by a spiral spring L. The tension of the spring may be such as desired, and such that the weight of the fruit will overcome it, so as to allow the required expansion or dilation of the lower end of the shield, or such that by moving the rod with the hand the tension will be overcome and the cord or rope thus slackened. After the fruit has passed from behind the shield the recoil of the spring will take up the slack and restore the shield to its normal condition. By connecting the cords to a rod extending the length of the trough or way the lower ends of all the shields can be slackened or expanded at the same time by merely moving the rod.

In order to facilitate the checking of the fall of the fruit, we place a cushion or check across the trough behind the shields, so that the fruit in sliding or rolling down the bottom of the trough will strike this cushion and thus have its progress checked, and when it strikes the cushion it bounds from the same and strikes the flexible shield, so that it is still further checked in its movement. This check or cushion is placed at such a distance below the upper end of the shields that the fruit will not be thrown up and out through the open space above the shield. This cushion or check is designated by the letter M, and may be merely a cord. It is preferably a continuation of the cord which connects the lower end of the shield to the trough, and thus among the other advantages has that of the increased elasticity imparted from the connection of the cord to the spring previously described.

The preferred mode of using the cord or rope J is to attach one end to the lower end of the rod K and run it thence through a hole in the side of trough B and through the loop in the shield and to the other side of the trough through a hole therein, thence upwardly and through a hole N in the side of the trough and across the trough above its bottom and through a hole in the opposite side of the trough, thence downwardly and through a hole in the rod K, thence upwardly and through another hole in the rod and upwardly and through the side of the trough and the loop in the shield above the lower end, and then through the side of the trough, and so on until it has been threaded through the whole series, when its upper end will be secured to the rod or some suitable part of the structure.

We provide for regulating the size of the channel through which the fruit falls back of the shields, so as to better adapt it to different sizes or kinds of fruit, by having a series of holes N throughout the depth of the sides of the trough, so that by shifting the check or cushion M from one set of holes to another the space between it and the flexible shield is increased or lessened according as it may be shifted, and the size of fruit thus better accommodated. It is obvious that in the same manner the distance of the lower end of the shield from the bottom of the trough may be increased or lessened if so desired. It will be observed that the lowest shield after passing around the cord J is extended to the rear of the chute and beyond the end of the bottom of the chute, so that when the fruit strikes the bottom shield it is thrown against the rearwardly-extending portion of the shield and finally discharged into a receptacle designed to receive it. It will also be observed that by using the lever-prop described the ladder and chute can be lifted with but very little effort, as the prop serves as a lever for the purpose.

We have described in detail what we consider the best construction and arrangement of each part; but in doing so we do not mean to restrict ourselves to details in construction when the same can be varied and at the same time involve the substance of our invention.

We do not confine ourselves to making the trough integral with the ladder, as it may be made separate and attached temporarily to any well-known construction of ladder already in use, and instead of using the canvas shields to the trough they may be made of wood or other suitable material, all of which we intend to include under the phrase "flexible shields," as it is apparent that if the shield be made of wood and have its lower end connected to the yielding or elastic cords it will as a shield be flexible, so as to give or move backward when struck by falling fruit, and in that sense it is intended to be regarded as included in the phrase "flexible shields," and the openings may be made elsewhere than on the front without departing from the spirit of our invention.

Having described our invention and set forth its merits, what we claim is—

1. In a fruit-gatherer, a trough or chute having an open face provided throughout its length with flexible shields secured at their upper ends to a suitable support and inclined inwardly, said shields being loose along their edges next to the sides of the trough and arranged to leave open spaces for the introduction of fruit to the chute, substantially as and for the purposes set forth.

2. In a fruit-gatherer, a trough or chute having rigid sides and an open face provided throughout its length with flexible shields secured at their upper ends to a suitable support and arranged to incline inwardly and leave intervening open spaces for the introduction of fruit to the chute, substantially as and for the purposes set forth.

3. In a fruit-gatherer, a trough or chute having an open face provided throughout its length with flexible shields secured at their upper ends to a suitable support and inclining inwardly, said shields being expansible and contractible at their lower ends and arranged to leave intervening open spaces for the introduction of fruit from outside the chute, substantially as and for the purposes set forth.

4. In a fruit-gatherer, a trough or chute having a series of flexible inclined shields along one side, secured at their upper ends to a suitable support, and cushions or checks within the trough, opposite said flexible shields, to check the dropping of the fruit and direct it oppositely against said shields, substantially as and for the purposes set forth.

5. In a fruit-gatherer, a trough or chute having a series of flexible inclined shields secured at their upper ends to a suitable support and arranged to leave intervening open spaces for the introduction of fruit from outside the chute, said shields having their lower portions connected to a part of the gatherer by an elastic connection and their sides left free, substantially as and for the purposes set forth.

6. In a fruit-gatherer, a trough or chute having a series of flexible inclined shields along its length, secured at their upper ends to a suitable support, and adjustable means connected with the lower portions of said shields to adjust them to contract and expand the space between the shields and back of the chute, substantially as and for the purposes set forth.

7. In a fruit-gatherer, a trough or chute having flexible shields provided with means for adjusting them at their lower portions, said means being connected to a common source of power to operate the series from said source, substantially as and for the purposes set forth.

8. In a fruit-gatherer, a trough or chute provided with a series of shields secured at their upper ends to a suitable support, a rope or cord connected with said shields, and means for creating slack in said cord and for taking up the slack to control the adjustment of said shields to contract and expand the space between the lower portion of the shields and the back of the trough, substantially as and for the purposes set forth.

9. In a fruit-gatherer, a trough or chute provided with a series of shields secured at their upper ends to a suitable support, a cord or rope passed back and forth through the chute and connected with the shields to form both a cushion or check to the falling fruit and means for adjustment of the shields, and means for creating slack in said cord and for taking up the slack to control said cushion and the adjustment of the shields, substantially as and for the purposes set forth.

10. In a fruit-gatherer, the combination, with a chute or trough for conveying fruit from an upper to a lower plane, of a flexible shield at the lower end of the trough for the fruit to fall against, said shield being extended from the front to the rear of the trough, below the bottom of the trough, to direct the fruit to its final discharge, and the cord $f$, connected to said shield, substantially as and for the purposes set forth.

11. In a fruit-gatherer, the combination of the trough or chute for conveying the fruit from a higher to a lower plane, and a ladder to which said trough or chute is secured, the trough being secured to the front of the ladder and having the rounds of the ladder lying back of the bottom and passed through and extended beyond its sides, substantially as and for the purposes set forth.

12. In a fruit-gatherer, the combination, with the trough or chute for conveying the fruit from a higher to a lower plane, of a tripod support therefor composed of the two sides of a ladder having the chute connected to the rounds of the ladder, with the rounds extending beyond the sides of the trough, and a lever-prop hinged to the structure to permit its free end to be extended in the direction of the upper end of the ladder parallel therewith, whereby when extended it is made to serve as a lever for lifting the trough and as a support therefor when the trough is raised, substantially as and for the purposes set forth.

13. In a fruit-gatherer, the combination, with the trough or chute serving as a conveyer for the fruit, of a ladder having the chute connected thereto, a prop hinged to the structure to permit its free end to be extended in the direction of the upper end of the ladder parallel therewith, whereby when extended it is made to serve as a lever for lifting the trough and as a support therefor when the trough is raised, and a rod or bar hinged to said prop and having catches to engage with a part of the ladder to brace the parts and hold them at the angle giving the desired inclination to the chute, substantially as and for the purposes set forth.

14. The fruit-gatherer comprising the ladder, the trough having a bottom and rigid sides and secured permanently to the ladder, and the flexible shields secured at their upper ends to a suitable support and arranged to incline inwardly and leave intervening open spaces for the introduction of fruit to the trough, substantially as and for the purposes set forth.

15. In a fruit-gatherer, the combination, with the trough or chute serving as a conveyer for the fruit, of shields adjustable at their lower ends to control the passage of the fruit and regulate the size of the opening in the trough through which the fruit passes, substantially as and for the purposes set forth.

In testimony whereof we affix our signatures in presence of two witnesses.

JOHN W. EMERSON.
AUSTIN C. STARBIRD.

Witnesses:
J. J. COMBS,
E. F. MILLER.